United States Patent [19]

Fox

[11] Patent Number: 4,808,479
[45] Date of Patent: Feb. 28, 1989

[54] WARP YARN SIZING COMPOSITION AND METHOD FOR MAKING AND USING SAME

[75] Inventor: Charles J. Fox, Atlanta, Ga.

[73] Assignee: Penick & Ford, Limited, Cedar Rapids, Iowa

[21] Appl. No.: 100,086

[22] Filed: Sep. 23, 1987

[51] Int. Cl.$^4$ .................. B32B 27/00; C08L 3/00
[52] U.S. Cl. ....................... 428/394; 106/213; 427/430.1; 427/439
[58] Field of Search ............. 106/213; 427/331, 430.1, 427/439; 428/394

[56] References Cited

U.S. PATENT DOCUMENTS

| | | | |
|---|---|---|---|
| 4,248,755 | 2/1981 | Williams | 427/331 |
| 4,373,099 | 2/1983 | Hubbard | 536/105 |
| 4,421,566 | 12/1983 | Hasuly | 106/213 |

OTHER PUBLICATIONS

"Chemistry & Industry of Starch", Kerr, R. W., 1950, pp. 570-575.
"Industrial Gums", Whistler, R. L., 1973, 654-655.

Primary Examiner—Theodore Morris
Attorney, Agent, or Firm—Marshall, O'Toole, Gerstein, Murray & Bicknell

[57] ABSTRACT

A warp yarn sizing composition and method of making and using same as a warp yarn size to control the abrasion between a warp yarn and a filling yarn in which a paste comprising a noncongealing, hydrophilic, starch ether or ester or combinations thereof exhibiting five gram alkali fluidity from about 10 millimeters to about 97 millimeters and a thin boiling starch is slashed to the warp yarn prior to a weaving operation and whose use, following the weaving operation, results in significantly shortened laundry cycles at lower temperatures, without detergents to achieve a soft hand form denim.

6 Claims, No Drawings

WARP YARN SIZING COMPOSITION AND METHOD FOR MAKING AND USING SAME

FIELD AND BACKGROUND OF THE INVENTION

This invention relates to a warp yarn sizing composition utilized in the manufacturing process for textiles and more particularly, to an improved warp yarn sizing composition suitable for use in the manufacture of fabric, particularly denim, comprising a noncongealing, hydrophilic, starch derivative exhibiting a five gram alkali fluidity of from about 10 milliliters to about 97 milliliters and from about 0 to about 80 wt % of a thin boiling starch.

In the course of manufacturing textiles, fiber materials are woven together to form a cloth. In the weaving operation feed yarn, referred to as warp yarn, is fed by a loom. A weaving yarn, referred to as a filling yarn, is woven in between the individual warp yarns to form a fabric. During this operation there is considerable abrasion between the warp yarn and filling yarn sometimes resulting in breakage and an inefficient weaving operation. To reduce abrasion between the warp yarn and the filling yarn, the warp yarn is sized with a warp yarn sizing composition. Many warp sizing materials are used in the manufacture of textile fabrics, particularly denim. Heretofore, the main property sought to be controlled by sizing warp utilized in the manufacture of denim was the abrasion reduction between the warp yarn and the filling yarn during the weaving operation. While other properties imparted to the fabric by use of a sized warp yarn such as stiffness and strength are pertinent, the primary property that the sized warp yarn must possess is the ability to reduce abrasion.

There are many warp yarn sizing compositions known in the art. For example, thin-boiling starches have been utilized as warp yarn sizing materials. It has been found, however, that while thin-boiling starches provide desired abrasion resistance during the weaving operation, they must be maintained and utilized at a temperature of not less than 180° F. Failure to maintain thin-boiling starches above this temperature results in the starches becoming congealed which adversely affects the ability of the starch to adhere to the warp yarn prior to a weaving operation. Additionally, the congealed starch loses adhesive strength.

Similarly, polyvinyl alcohol (PVA) also has been utilized as a warp yarn sizing composition. However, it is relatively expensive and, in some instances, gives irregular appearance to a fabric upon subsequent fabric washing and cleaning.

When a denim material or fabric is manufactured, the woven fabric is shipped directly to the garment manufacturer following a weaving operation and following a subsequent finishing process such as sanforizing or finish sizing. The woven denim is relatively stiff from incorporation of the warp yarn sizing composition and this stiffness serves to facilitate cutting and sewing operations performed to complete a denim garment. After the denim garment is formed, it is laundered to remove the warp yarn sizing composition to achieve a relatively soft hand form of the garment as required by market demands. The laundering operation is substantially costly due to the fact that commercially available warp yarn sizing compositions are water insoluble. This water insolubility presents a problem in that the wash of the denim garment following manufacture requires a laundry cycle which utilizes elevated temperatures, chemicals, and an extended duty cycle, typically thirty-eight minutes, to achieve sufficient removal of the warp yarn sizing composition to provide an acceptable soft hand form of the denim garment.

Because of the limited number of commercial laundries, the laundering operation is a production inhibiting step not only for soft hand form denim garments, but also for garments subsequently formed from soft hand form denim such as bleached and stonewashed denim garments. Further, the appearance of these garments may be adversely affected by non-uniform removal of the warp yarn sizing.

What is desired is to have a material which provides the desired abrasion resistance and stiffness properties, can be utilized in a warp yarn sizing operation, is relatively inexpensive and is sufficiently water soluble to permit a significantly shortened laundry cycle at lower temperatures without detergents. The sizing material when used with a denim fabric should provide a soft hand form denim garment and improved appearance due to facilitating pressing and handling operations following the laundry cycle.

Additionally, it is important that the material be removed uniformly during the laundry cycle so that subsequent bleaching and stonewashing operations do not adversely affect the appearance of the denim garment.

SUMMARY OF THE INVENTION

The invention disclosed and claimed herein serves to obviate the disadvantages associated with the prior art. Briefly, the present invention relates to a warp yarn sizing composition comprising a noncongealing, hydrophilic, starch ether or ester or combinations thereof exhibiting a five gram alkali fluidity of from about 10 milliliters to about 97 milliliters, and from about 0 to about 80 wt % of a thin boiling starch. Preferably, the noncongealing, hydrophilic, starch ether or ester used in the warp yarn sizing composition of the present invention is a hydroxyalkyl ether modified starch derivative. The concentration of the hydroxyalkyl ether modified starch derivative in the warp yarn sizing composition is from about 20 wt % to about 100 wt % and preferably from about 40 wt % to about 60 wt %.

The warp yarn sizing material of the present invention is relatively inexpensive, when compared to a PVA sizing agent. While the warp yarn sizing composition of the present invention is cooked at 180° F. or higher, it can, in some instances, ultimately be cooled to less than 140° F. for use in a sizing preparation, resulting in energy cost savings during the weaving operation.

Further, the warp yarn sizing composition of the present invention significantly reduces abrasion between the warp yarn and the filling yarn during the weaving operation. Moreover, upon subsequent washing or cleaning of the fabric formed with warp yarn sized with the sizing material of the present invention, no substantial irregular and undesired fabric appearance occurs. The sizing material of the present invention has no masking effect on the appearance of the fabric, and appearance of the fabric is enhanced by the sizing material facilitating subsequent pressing and handling operations.

Additionally, it is believed that the warp yarn size of the present invention facilitates the controlled sanforization of fabric other than denim by dimensionally stabilizing the fabric.

DETAILED DESCRIPTION OF THE INVENTION

According to the invention, a warp yarn sizing composition containing a noncongealing hydrophilic starch derivative exhibiting a five gram alkali fluidity from about 10 milliliters to about 97 milliliters, and from about 0 to about 80 wt % of a thin boiling starch achieves one or more of the following objectives:

a sizing composition that serves to provide abrasion resistance between the warp yarn and the filling yarn during a weaving operation;

a sizing composition that serves to provide the requisite dimensional stability and other requisite physical properties of the woven fabric;

a sizing composition which is relatively stable, easy to handle, exhibits good shelf life and which may be, in some instances, applied to warp yarn at low temperatures;

a sizing composition which is sufficiently water soluble to permit a significant reduction in a laundry cycle at lower temperatures without detergents to obtain a soft hand form of denim garment.

According to the invention, a warp yarn sizing composition contains a noncongealing hydrophilic starch ether or ester or combination thereof exhibiting an alkali fluidity of from about 10 milliliters to about 97 milliliters for a five gram sample and from about 0 to about 80 wt % of a thin boiling starch. Preferably the noncongealing hydrophilic starch ether or ester used in the warp yarn sizing composition of the present invention exhibits an alkali fluidity of from about 75 milliliters to about 85 milliliters for a five gram sample.

Further, according to the invention, the warp yarn sizing composition contains a hydroxyalkyl ether modified starch derivative.

More particularly, the warp yarn sizing composition present invention contains a 2-hydroxyethyl ether modified starch.

The alkali fluidity is determined by utilizing a method described in Kerr, *Chemistry and industry of Starch*, 2d ed., Chp. 6, "Evaluation of Modified Starches in Practice", Academic Press (1950). The Kerr method, which uses five gram samples, was modified to use 10 gram and 20 gram sample sizes to achieve greater accuracy in the measurement of the alkali fluidity as the hydroxyalkyl ether modified starch derivatives used in the present invention decrease in molecular weight due to increasing acid modification of the starch backbone. It has been found that the optimal alkali fluidity for the hydroxyalkyl ether modified starch derivative used in the present invention exhibits a fluidity of about 58 milliliter to about 64 milliliter for a ten gram sample.

The hydroxyalkyl ether modified starch derivative used in the finishing size of the present invention is provided in a granular form. Prior to the warp yarn sizing step, the hydroxyalkyl ether modified starch derivative is mixed with a thin boiling starch to obtain a concentration of about 20 wt % to about 100 wt %, preferably about 40 wt % to about 60 wt % of a starch derivative. The mixture is heated from about 165° F. to about 212° F. for about 15 minutes to form the sizing or paste of the present invention. Alternatively, the mixture may be jet cooked in a conventional manner. Following heating, the warp yarn sizing may be cooled to about 140° F. if 100 wt % hydroxyalkyl ether modified starch derivative is used, but typically the sizing is used at a temperature of about 190° F.

Warp yarn sizing may be carried out by slashing the warp yarn sizing of the present invention onto the warp yarn such that the warp yarn sizing is applied to all of the surface of the warp yarn prior to weaving with the filling yarn. Slashing is achieved by feeding the warp yarn through a conventional slasher containing the warp yarn sizing composition. It is important to provide sufficient agitation during the mixing, heating and slashing to maintain proper viscosity and paste uniformity.

After slashing, the finished sized warp yarn is conventionally woven with the feed yarn.

It is appreciated that hydroxyalkyl ether includes the hydroxyethyl and hydroxypropyl ethers. Other starch ethers contemplated for use in the finishing size of the present invention include carboxy methyl ether modified starch. Further, the starch esters contemplated for use in the invention include acetate ester modified starch and succinate ester modified starch, or the like either singularly or in combination with each other or the starch ethers so long as such combinations do not exhibit congealing at or about the temperature at which the warp yarn is slashed.

While the preferred hydroxyalkyl ether modified starch is made from corn or potato starch, it is appreciated that other cereal starches such as waxy maize, high amylose, wheat, rice and the like or tubular starches such as tapioca and the like, or fractions of amylose or amylopectin therefrom may be used.

The preferred thin boiling starch is an acid thinned corn starch. It is appreciated that other acid thinned starches such as waxy maize, wheat, tapioca and potato may be used. These starches are well known in the art. See Whistler, Miller, Pasehall, *Starch: Chemistry and Technology*, 2d ed., Chp. 17, Academic Press (1984).

EXAMPLES

The following specific examples are provided in order to clearly illustrate the practice of the invention but are not to be considered to limit the scope of the invention in any way.

In the following examples warp yarn was sized with a warp yarn sizing composition made in accordance with the present invention. Following the sizing operation, and subsequent weaving and tailoring, laundering operations were carried out to determine what, if any, effect the use of a warp sizing composition made in accordance with the present invention had on the laundering cycle.

EXAMPLE I

In this Example, 100 lbs. of a 2-hydroxyethyl ether modified starch having approximately 10% by weight water content, exhibiting a ten gram alkali fluidity of 61 milliliters was added to 100 lbs cross linked thin boil starch Clinton 692B, manufactured by Clinton Starch, Clinton Iowa, having a 5 gram alkali fluidity of 19 and brought close to boiling by steam injection to form a paste. The resulting warp yarn size or paste was maintained at about 190° F. The warp yarn size was then slashed onto 100% cotton warp yarn used to weave 10 oz. denim canvas. Sufficient agitation was provided to maintain uniformity of the paste. Following the weaving operation, there was an average weight increase of the woven fabric of about 11% due to add-on of the warp yarn size. The warp yarn size was successfully applied to the warp yarn at temperatures of about 190° F. The warp yarn sized canvas was reported to exhibit acceptable dimensional stability in accordance with industry testing procedures. The woven fabric was shipped to a garment fabricator where it was sewn and cut into final garments, denim jeans. It was reported that the fabric exhibited acceptable cutting and sewing properties.

The garments were then laundered to obtain a soft hand form of the denim jeans. Heretofore, the reported normal wash cycle without detergents in denim jeans utilizing commercially available warp yarn sizing, such as 100% thin boil starch, was 38 minutes, at elevated temperatures utilizing detergents.

The reported wash cycle for denim jeans manufactured with the warp yarn size of this example, was 12 minutes, at reduced temperatures, without detergents.

It was reported that the appearance of the laundered garments made using the warp yarn size of this example was enhanced. It is believed that the warp yarn size of the present invention enhances the appearance of the garments by facilitating pressing and handling operations.

EXAMPLE II

In this Example, 200 lbs. of a 2-hydroxyethyl ether modified starch having approximately 10% by weight water content, exhibiting a ten gram alkali fluidity of 61 milliliters was brought close to boiling by steam injection to form a paste. The resulting warp yarn size or paste was maintained at about 190° F. The warp yarn size was then slashed onto 100% cotton warp yarn used to weave 10 oz. denim canvas. Sufficient agitation was provided to maintain uniformity of the paste. Following the weaving operation, there was an average weight increase of the woven fabric of about 11% due to add-on of the warp yarn size. The warp yarn size was successfully applied to the warp yarn at temperatures of about 190° F. The warp yarn sized canvas was reported to exhibit acceptable dimensional stability in accordance with industry testing procedures. The woven fabric was shipped to a garment fabricator where it was sewn and cut into final garments, denim jeans. It was reported that the fabric exhibited acceptable cutting and sewing properties.

The garments were then laundered to obtain a soft hand form of the denim jeans.

The reported wash cycle for denim jean manufactured with the warp yarn size of this example, was 12 minutes, at reduced temperatures, without detergents.

It was reported that the appearance of the laundered garments made using the warp yarn size of this example was enhanced.

We claim:

1. A method of preparing a sized warp yarn said method comprising:
   (a) preparing a mixture comprising a noncongealing hydrophilic starch derivative exhibiting a five gram alkali fluidity of from about 10 milliliters to about 97 milliliters and a thin boiling starch;
   (b) heating the mixture to at least 165° to form a warp yarn sizing paste;
   (c) slashing a warp yarn with the paste of step (b); and
   (d) removing excess paste from the slashed warp yarn.

2. The method of claim 1 wherein the noncongealing hydrophilic substituted starch derivative comprises 2 hydroxyethyl ether modified starch and a concentration of from about 20 wt % to about 100 wt %.

3. The method of claim 1 wherein the substituted starch derivative is selected from at least one of the group consisting of hydroxyethyl ether modified starch, hydroxypropyl ether modified starch, carboxymethyl ether modified starch, acetate ester modified starch and succinate ester modified starch.

4. The method of claim 1 wherein the noncongealing hydrophilic substituted starch derivative comprises 2-hydroxyethyl ether modified starch exhibiting a 10 gram alkali fluidity of from about 58 milliliters to about 64 milliliters.

5. The sized warped yarn prepared by the method of claim 4.

6. The sized warp yarn prepared by the method of claim 1.

* * * * *